United States Patent [19]

Brackett

[11] Patent Number: 5,259,256
[45] Date of Patent: Nov. 9, 1993

[54] MOTION CONVERTER WITH PINION SECTOR/RACK INTERFACE

[76] Inventor: Douglas C. Brackett, P.O. Box 306, Portland, Me. 04112

[21] Appl. No.: 924,547

[22] Filed: Jul. 31, 1992

[51] Int. Cl.$^5$ .............................................. F16H 21/18
[52] U.S. Cl. ............................................ 74/49; 74/50; 123/56 AC
[58] Field of Search ..................... 74/46, 49, 50; 123/56 AC, 56 BC, 197.3, 197.4

[56] References Cited

U.S. PATENT DOCUMENTS

| | | |
|---|---|---|
| 34,400 | 2/1862 | Barden . |
| 130,371 | 8/1872 | Hendryx ................................. 74/49 |
| 283,558 | 8/1883 | Baumgarten . |
| 813,736 | 2/1906 | Pendleton . |
| 999,220 | 8/1911 | Harmon . |
| 1,687,425 | 10/1928 | Briggs . |
| 2,312,057 | 2/1943 | Williams ................................. 74/49 |
| 2,366,237 | 1/1945 | Clausen . |
| 2,628,602 | 2/1953 | Butterfield . |
| 3,386,429 | 6/1968 | Trammell, Jr. . |
| 3,451,276 | 6/1969 | Wadlow et al. . |
| 4,270,395 | 6/1981 | Grundy ................................. 74/49 |
| 4,339,960 | 7/1982 | Senft . |
| 4,485,768 | 12/1984 | Heniges . |
| 4,685,342 | 8/1987 | Brackett . |
| 4,779,472 | 10/1988 | Brackett . |
| 4,803,890 | 2/1989 | Giuliani et al. . |
| 4,887,560 | 12/1989 | Heniges . |

FOREIGN PATENT DOCUMENTS

| | | |
|---|---|---|
| 152799 | 10/1920 | United Kingdom . |
| 533047 | 2/1941 | United Kingdom . |

Primary Examiner—Allan D. Herrmann
Assistant Examiner—David W. Laub
Attorney, Agent, or Firm—Ralph W. Selitto, Jr.

[57] ABSTRACT

A device for translating rotary to linear motion and vice versa includes a reciprocating linearly moving shuttle with a central aperture. The aperture has a pair of opposing gear racks protruding towards the center and which capture therebetween a pair of pinion sectors rotatably mounted to the crankpin of a rotatable crankshaft with the axis of crankshaft rotation perpendicular to the linear path of the shuttle. The pinion sectors are free to rotate about the crankpin and articulate independently of each other through a selected angular range. When the crankpin, including the pinion sectors, is inserted into the shuttle aperture with the pinion sectors engaging the racks, motion is transferable between the crankpin and the shuttle through the pinion sectors.

50 Claims, 6 Drawing Sheets

MOTION CONVERTER WITH PINION SECTOR/RACK INTERFACE

FIELD OF THE INVENTION

The present invention relates to devices for converting linear motion to rotary motion and vice versa, and, more particularly, to a scotch yoke type device having an improved slot/crankpin interface.

DESCRIPTION OF THE PRIOR ART

The scotch yoke has been used for many years as a means for converting reciprocating linear movement to rotary motion and vice versa. It has found application in a variety of machines, such as motors, pumps, and compressors which utilize a piston articulated within a closed cylinder, see, e.g., U.S. Pat. Nos. 283,558, 813,736, 999,220, and 2,628,602, as well as, in compactors, pumps, punch presses, robots, sewing machines, generators, and material handlers.

The essential components of a scotch yoke are a crankpin rotated about a crankshaft center at an axial offset and a shuttle having a slot therein through which the crankpin is positioned. The motion of the shuttle is constrained to a linear path by a guide, frequently, a pair of opposing parallel guide surfaces. The crankshaft and crankpin move in rotary motion and may be either the driven elements or the driving elements. The shuttle moves in rectilinear motion and likewise may be the driven element or the driving element. Thus, the scotch yoke provides a means for converting linear to rotary motion and vice versa.

The slot within the shuttle must be at least as wide as the crankpin diameter and long enough to accommodate the crankpin dimension and its travel. A pair of competing objectives in the design of scotch yokes is to eliminate friction, as well as clearance at the crankpin/slot interface. Friction results in energy loss in the conversion from linear to rotary motion or vice versa and also in wear of the scotch yoke. Clearance at the interface results in a loss of motion translation, commonly called "backlash", when converting from rotary to linear and vice versa (i.e., there is no translation during traversal of the clearance gap), and in brinelling, spalling and vibrations when the unrestrained driving element accelerates across the clearance gap and collides into the driven element. As has been recognized for many years, the consequences of clearance and friction at the slot/crankpin interface are energy inefficiency and excessive wear and tear.

A variety of methods have been proposed to simultaneously achieve minimum crankpin to slot clearance and friction. For example, in U.S. Pat. No. 1,687,425 a spring urged lever presses against the crankpin to eliminate excess clearance. In U.S. Pat. No. 2,366,237 the shuttle includes a bearing block having a center roller bearing for the crankpin and side roller bearings to reduce friction between the block and the remainder of the shuttle.

U.S. Pat. No. 4,685,342 to Douglas C. Brackett, the inventor herein, entitled DEVICE FOR CONVERTING LINEAR MOTION TO ROTARY MOTION OR VICE VERSA, discloses a scotch yoke device having a pair of opposing, offset bearing surfaces, one on either side of the crankpin slot in the shuttle. A corresponding pair of roller bearings are arranged on the crankpin coaxially and laterally displaced from one another such that each aligns with one of the pair of opposing, offset bearing surfaces of the slot within which the crankpin is positioned. In this manner, clearance at the crankpin/slot interface can be minimized to manufacturing tolerances and friction is reduced to the rolling friction of a roller bearing.

Whereas different motion translation applications have varying requirements with respect to loading stresses, materials, cost, etc., it remains an objective in the art to create new scotch yoke designs having alternative structural and functional characteristics while achieving energy efficiency and wear resistance. It is therefore an object of the present invention to provide an alternative scotch yoke design which tends to simultaneously minimize clearance and friction between the crankpin and the shuttle slot.

SUMMARY OF THE INVENTION

The problems and disadvantages associated with conventional scotch yoke devices utilized for translating rotary to linear motion and vice versa are overcome by the present invention which includes a shuttle adapted to move along a linear path and having an aperture therein. At least a portion of the peripheral boundary of the aperture defines a trackable profile. A pair of tracking sectors are rotatably mounted to the crankpin of a rotatable crankshaft such that the sectors rotate about the crankpin and articulate independently through a selected range of arcuate motion. The crankpin, including the tracking sectors, is positioned within the shuttle aperture with the tracking sectors engaging the trackable profile such that motion is transferable between the crankpin and the shuttle through the tracking sectors.

BRIEF DESCRIPTION OF THE DRAWINGS

For a better understanding of the present invention, reference is made to the following detailed description of various exemplary embodiments considered in conjunction with the accompanying drawings, in which.

DETAILED DESCRIPTION OF THE EXEMPLARY EMBODIMENTS

Although the present invention is applicable to any machine which utilizes a scotch yoke, examples of which are mentioned above, it will be explained herein in terms of its application to a reciprocating piston device, such as an internal combustion engine or a compressor.

Figure 1:
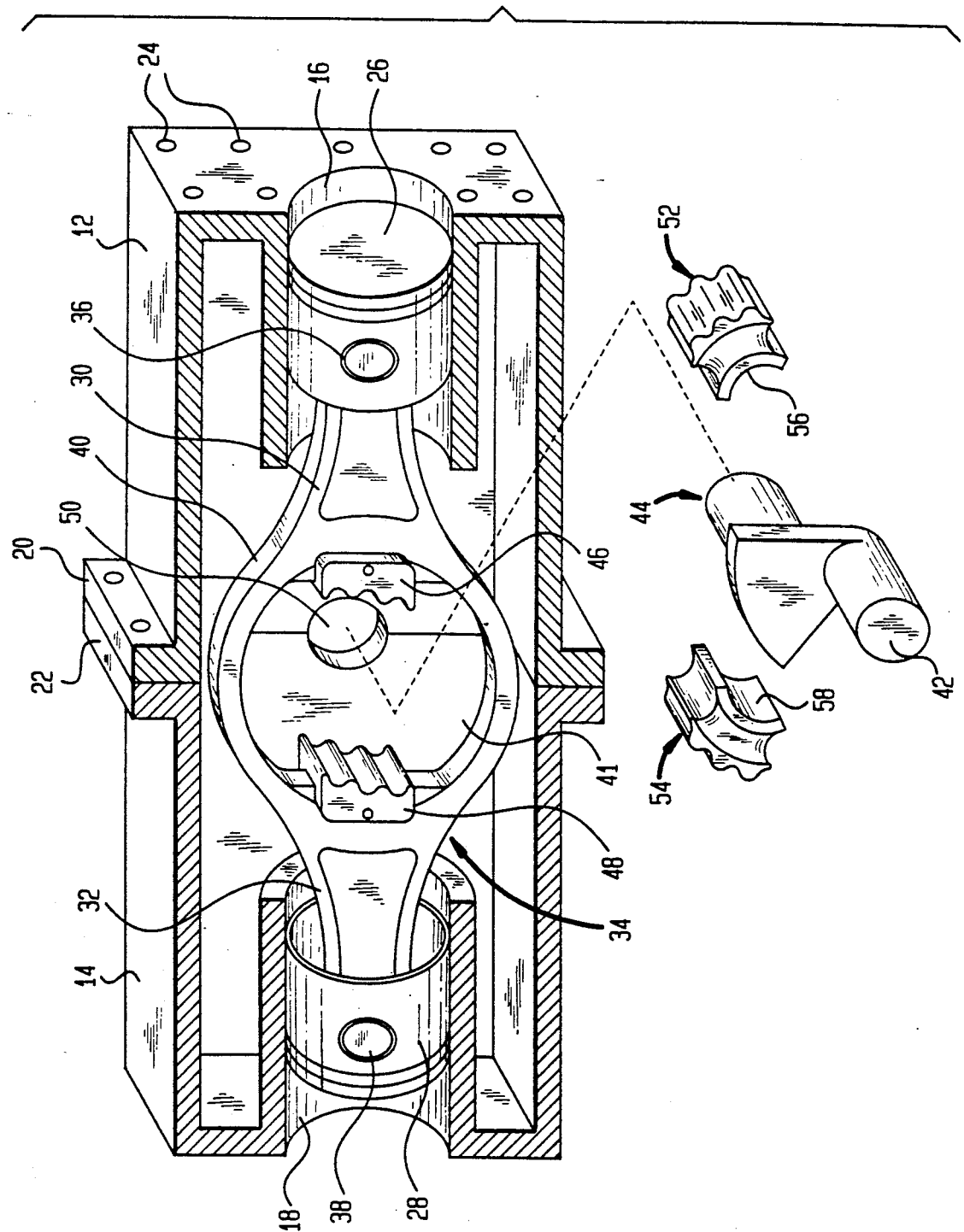
FIG. 1 is an exploded, cutaway, perspective view of a reciprocating piston device employing a first exemplary embodiment of the present invention.

FIG. 1 shows a piston device 10 with a pair of cylinder blocks 12, 14, each of which has a cylinder bore 16 and 18, respectively. The blocks 12, 14 would be joined together via opposing flanges 20, 22 by bolts etc. or by studs extending through the blocks and projecting from holes 24 for securing a cylinder head (not shown) via suitable nuts (not shown) as would be conventional in constructing cylinder blocks with opposed cylinders. The cylinder bores 16 and 18 receive corresponding pistons 26 and 28 which are mounted upon the terminal ends of extensions 30 and 32 of shuttle 34 by wrist pins 36 and 38 or other conventional means. The extensions 30 and 32 emanate from a common yoke portion 40 of the shuttle 34.

The yoke portion 40 is provided with an aperture 41 which accommodates a crankpin 42 of crankshaft 44. The internal peripheral boundary of the aperture 41, instead of simply being a smooth slot, includes a pair of opposing gear racks 46 and 48 on either side thereof. In the embodiment depicted, the gear racks 46, 48 are a pair of discrete elements, each being bolted to the shuttle 34 on opposing sides of the aperture 41. Alternatively, the gear racks 46, 48 could be defined by an apertured plate or plates secured to or integrated with the shuttle 34, the aperture being formed such that the interior periphery defines the gear racks 46 and 48. It should be appreciated that while the aperture 41 passes completely through the shuttle 34, it is possible to replace the aperture 41 with a recess or blind hole. For example, in the device shown in FIG. 1, if the yoke portion 40 were closed by a continuous metal surface on the side closest to the viewer, a recess facing toward bearing opening 50 would be formed. This recess could accommodate the free end of the crankpin 42. The use of the aperture 41 is beneficial because it permits the crankshaft 44 to project through the shuttle 34, whereby additional bearings and crankpins may be made a part thereof, such as, for example, to cooperate with another set of adjacent pistons.

The crankpin 42 has a pair of pinion sectors 52, 54 rotatably associated therewith when the crankshaft 44 is in place in the bearing opening 50, as is more clearly shown in FIGS. 2 through 5. With the crankshaft 44 positioned within the opening 50 and the crankpin 42, including the pinion sectors 52 and 54, positioned within the aperture 41 of the yoke portion 40, the pinion sectors 52 and 54 mesh with the gear racks 46 and 48, which capture the crankpin 42 and the pinion sectors 52 and 54 therebetween. The crankpin 42 is isolated from contact with the periphery of the yoke portion 40 and instead bears upon bearing surfaces 56 and 58 of the pinion sectors 52, 54. As can be appreciated, this arrangement prevents the crankpin 42 from bearing upon the yoke portion 40 directly and permits the fitting of the crankpin 42 to the aperture 41 within manufacturing tolerances.

As can be seen, the gear racks 46, 48 and the pinion sectors 52, 54 mesh together in conjugation throughout the range of motion of the apparatus and thus their combination could be denominated a conjugate driver. It should be noted that the present invention is not intended to be restricted to any particular form of rack and sector gearing as might be implied from the traditional definition of these terms. For example, FIGS. 1-5 depict concentric, tri-lobed, epicycloidal/hypocycloidal pinion sectors 52 and 54 and mating, hypocycloidal/epicycloidal gear racks 46, 48 which have a pitch line inclined from the perpendicular of the direction of reciprocating motion.

The foregoing configuration provides certain functional advantages over a roller bearing riding upon a flat surface or more traditional gear shapes as shown in the patents discussed above. As can be appreciated in FIGS. 2-5, the area of contact between sector and rack is substantially increased over the line contact of a roller bearing (or wheel) on a flat, hard surface. This results in the potential of the present invention to endure greater normal loading forces, thereby increasing its power density. The epicycloidal/hypocycloidal and hypocycloidal/epicycloidal arrangement depicted herein can support greater loading forces directed along the line perpendicular to the pitch line than gear shapes which are intended to transfer torsional forces acting parallel to the pitch line.

After all the various embodiments of the present invention are considered below, it should be apparent that the gear racks 46, 48 and the pinion sectors 52, 54 can be configured in a variety of ways. In each instance, however, it is an objective to prevent scuffing and to provide an adequate load bearing support surface. Scuffing of the surfaces is avoided when the pinion sectors 52, 54 track along the profiles of the gear racks 46, 48 without loss of contact or slippage throughout the range of motion of the device. Gear racks 46, 48 thus constitute trackable profiles with respect to the pinion sectors 52, 54. In addition, one could observe that the total circumferential length of the trackable profile of each of the gear racks 46, 48 equals the total circumferential length of the corresponding pinion sectors 52, 54 which tracks over it.

The gear racks 46, 48 and the pinion sectors 52, 54 may be formed of hardened steel or other materials as commonly used to form gears and may include surface treatments to reduce wear, friction and production costs (e.g., electroplating, nitriding, spray dispersement and, in general, any known metallurgical or coating process). The weight of the gear racks 46, 48 could be reduced by forming them as a multi-material matrix of aluminum and steel or other metal or non-metal matter. The bearing surfaces 56 and 58 of the pinion sectors 52, 54 may be similarly enhanced by surface treatment or bonding with a friction-reducing bearing material.

One should further note that the shuttle 34 is confined to a rectilinear path by the cylinders 16, 18 and the pistons 26, 28, rather than by an independent guide acting upon the shuttle 34 proximate the yoke portion 40. The tracking profiles of the pinion sectors 52, 54 act as self-aligning interfaces as they mesh with their respective gear racks 46, 48. Of course, the motion conversion apparatus of the present invention could be used on any application requiring conversion between rotary and linear reciprocating motion and, on those applications not requiring pistons, a guide may be provided. Even in the embodiment shown, a guide as would be known from a prior art scotch yoke device could be employed to further insure rectilinear motion of the shuttle 34 and relieve the pistons and cylinders from side loading forces.

Figure 2:
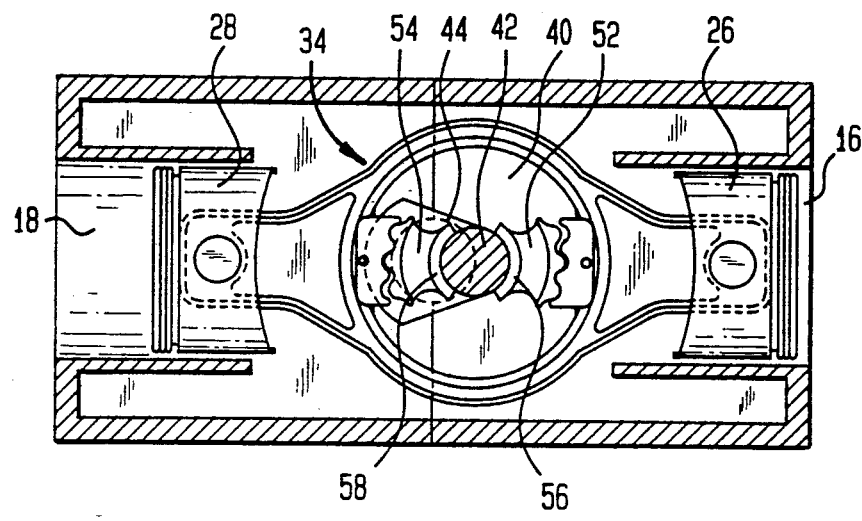
FIGS. 2-5 are a series of schematic elevational views of an embodiment of the present invention as it is moved through a portion of its range of motion.
Figure 3:
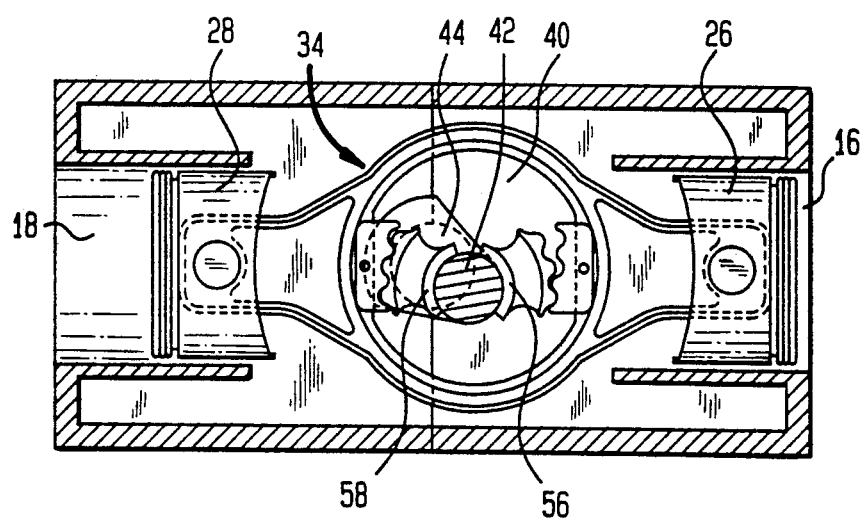
Figure 4:
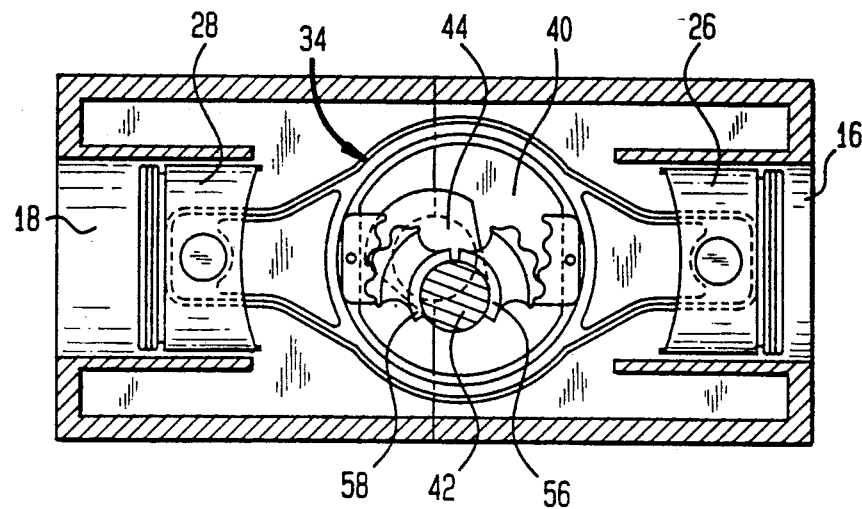
Figure 5:
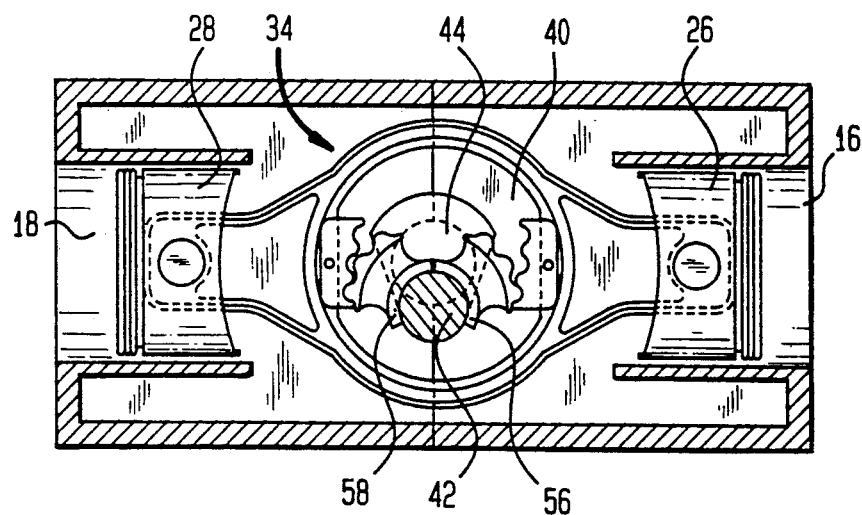

FIGS. 2-5 show the present invention at four different positions during the travel of the crankshaft 44 through 90 degrees of rotation. FIG. 2 shows the crankpin 42 at 0 or 360 degrees relative to the axis of the cylinders 16, 18 or Top Dead Center (TDC) for piston 26 and Bottom Dead Center (BDC) position for piston 28. FIG. 3 shows the crankpin 42 at 30 degrees After Top Dead Center (ATDC). In FIG. 4, the crankpin 42 is at 60 degrees ATDC and, in FIG. 5, the crankpin 42 is at 90 degrees ATDC.

As the crankshaft 44 rotates, the crankpin 42 moves up and down within the yoke portion 40 relative to the axis of the cylinders 16, 18 (i.e., in a vertical direction). The horizontal component of crankpin 42 motion is translated into the rectilinear motion of the shuttle 34. The crankpin 42 is captured between the bearing surfaces 56, 58 of the pinion sectors 52, 54 and is therefore prevented from contacting the interior periphery of the aperture 41. The pinion sectors 52, 54 pivot about the crankpin 42 as the crankshaft 44 rotates, the gear racks 46, 48 being immovable in the direction perpendicular to the linear path of the shuttle 34 and the pistons 26, 28. The pinion sectors 52, 54 pivot in opposite directions and can therefore be said to be counter-rotating. The crankpin 42, assuming that it has an axial offset "r" from the crankshaft 44, causes a reciprocating linear motion of the shuttle of magnitude 2r, ranging from $-r$ to $+r$.

Figure 10:
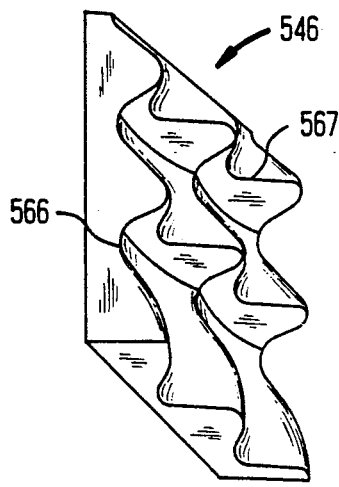
FIG. 10 is a perspective view of a rack in accordance with a sixth exemplary embodiment of the present invention.
Figure 11:
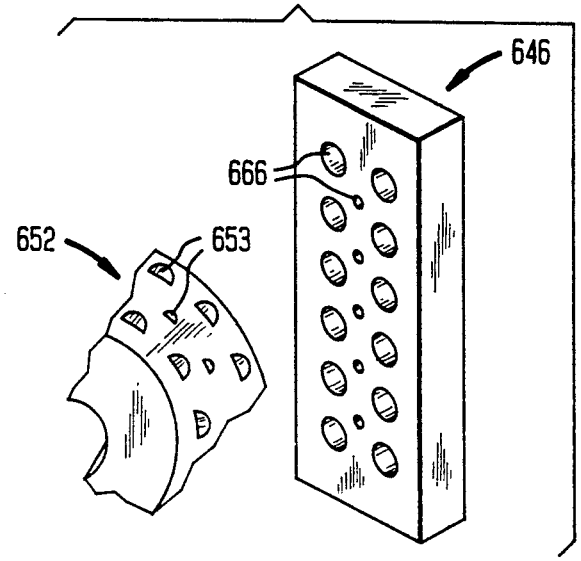
FIG. 11 is a perspective view of a rack and mating pinion sector in accordance with a seventh exemplary embodiment of the present invention.
Figure 12:
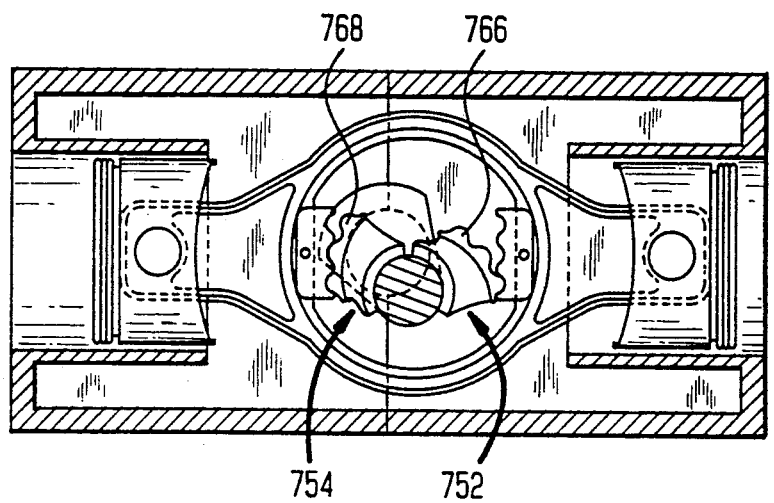
FIG. 12 is a schematic elevational view of a reciprocating piston device employing a rack and mating pinion sector in accordance with an eighth exemplary embodiment of the present invention.
Figure 13:
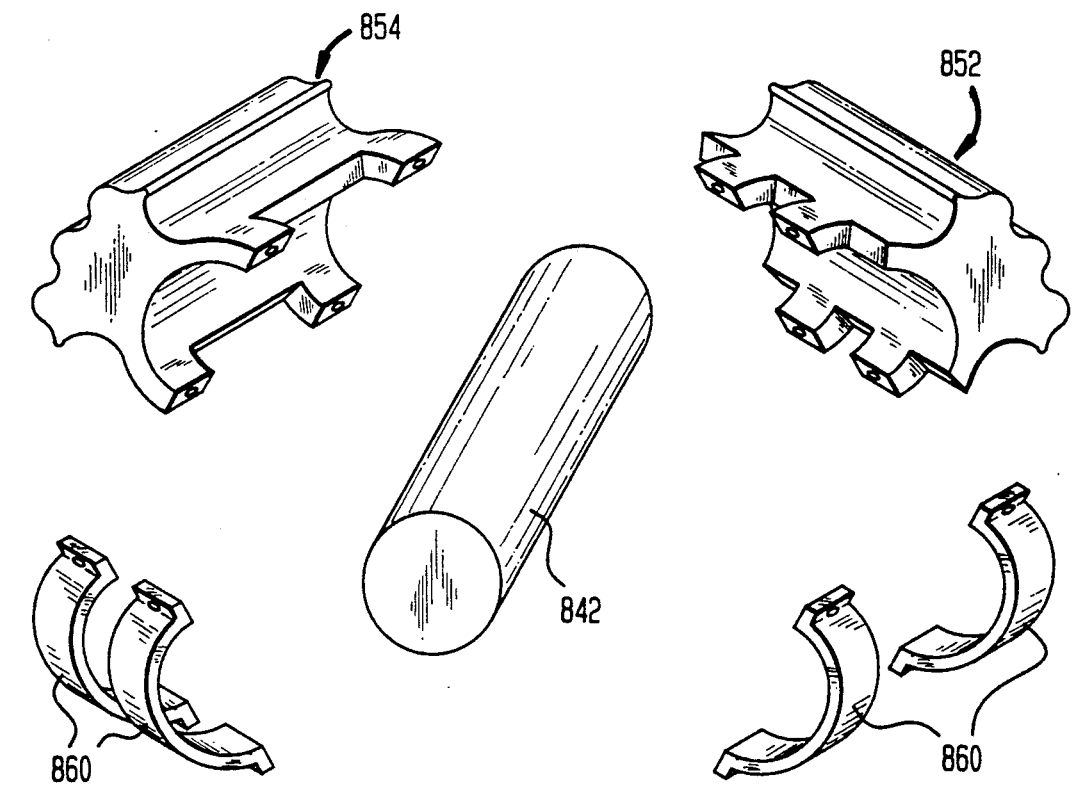
FIG. 13 is an enlarged, exploded, perspective view of a ninth exemplary embodiment of the present invention.
Figure 14:
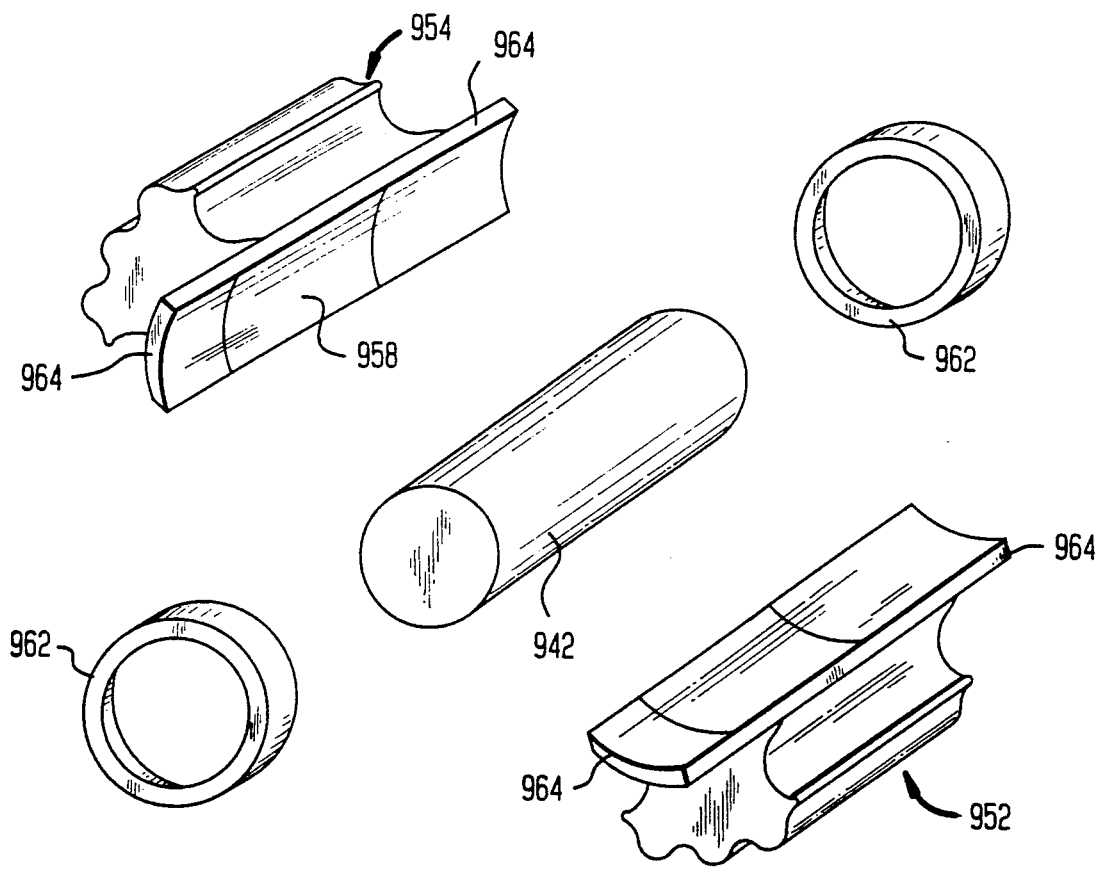
FIG. 14 is an enlarged, exploded, perspective view of a tenth exemplary embodiment of the present invention.

FIGS. 6-11 depict various rack (trackable profile) shapes, while FIGS. 12-14 depict various pinion (tracking) sector configurations. In FIGS. 6-14, a numbering convention is employed wherein elements shown therein having a function or structure in common with a counterpart in previously discussed FIGS. 1-5 are given the same number incremented by 100 in each succeeding embodiment. It should be appreciated that there is an infinite variety of possible profiles.

Figure 6:
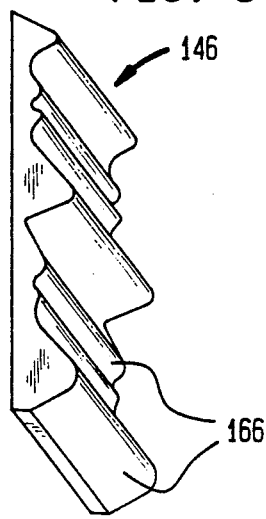
FIG. 6 a perspective view of a rack in accordance with a second exemplary embodiment of the present invention.
Figure 7:
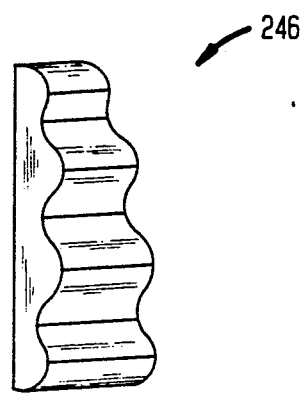
FIG. 7 is a perspective view of a rack in accordance with a third exemplary embodiment of the present invention.

With reference initially to FIG. 6, a straight rack 146 has "gear teeth" 166 of varying height and shape. Given this degree of variability, the teeth 166 may be more generally described as "undulations" in the tracking surface of the sector 146 relative to a selected base plane 168 (i.e., any selected plane of reference). Such variations permit varying the frictional interaction between the rack and the sector, as well as varying load carrying potential.

Figure 8:
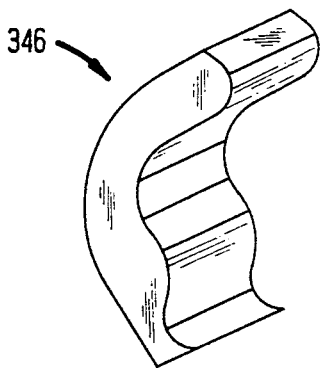
FIG. 8 is a perspective view of a rack in accordance with a fourth exemplary embodiment of the present invention.
Figure 9:
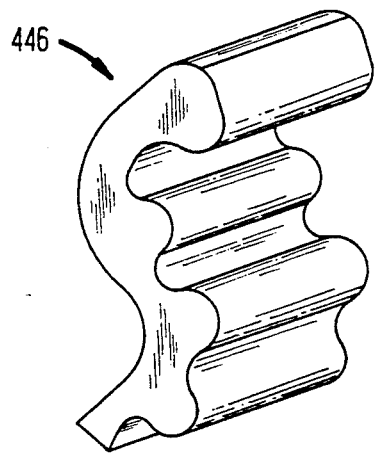
FIG. 9 is a perspective view of a rack in accordance with a fifth exemplary embodiment of the present invention.

Referring now to FIGS. 7-11, FIG. 7 shows a straight, uniform tooth rack 246 which is tapered in width. FIG. 8 depicts a simple curved rack 346 with substantially uniform tooth height. FIG. 9 illustrates a rack 446 with substantially uniform tooth height but in a compound "S"-shape. FIG. 10 shows a straight, uniform rack 546 having a tooth wave 567 across the width of the rack (i.e., secondary undulations disposed at an angle relative to primary undulations 566). FIG. 11 depicts a straight rack 646 with dimples 666 of two sizes and a mating sector 652 with pimples 653.

As one can appreciate, FIGS. 6-11 are merely samples from an infinite set. The rack pitch line can also be inclined to an infinitely variable degree from the vertical (i.e., from an orientation perpendicular to the cylinder axis or the shuttle motion direction). The racks need not be identical, nor do the sectors have to be identical. Since the sectors have a tooth shape which tracks upon the profile of the racks, the sector tooth shape has the same degree of variability as the rack shape.

Referring to FIG. 12, it can also be seen that the sector teeth 766, 768 can be eccentric relative to the axis of rotation of the pinion sectors 752, 754. FIGS. 2-5, on the other hand, illustrate concentric sectors.

FIG. 13 shows a pair of tri-lobed pinion sectors 852, 854 and associated bearing retainer caps 860. The bearing retainer caps 860 may be used to affix the pinion sectors 852, 854 via bolts or other conventional means to the crankpin 842 while permitting rotation relative thereto.

FIG. 14 shows retainer rings 962 adapted to embrace tabs 964 which project from the bearing surfaces 956, 958 for the purpose of retaining the pinion sectors 952, 954 on the crankpin 942. It should be observed that in the embodiments of the present invention shown in FIGS. 1-12, there is no means employed for retaining the pinion sectors 52, 54 in association with the crankpin 42 other than their mechanical fit between the crankpin 42 and the respective gear racks 46, 48. Accordingly, the pinion sectors 52, 54 are freely rotatable about the crankpin 42 through 360 degrees and articulate independently of each other over a range determined by the respective number of degrees each sector subtends.

It will be understood that the embodiments described herein are merely exemplary and that a person skilled in the art may make many variations and modifications without departing from the spirit and scope of the invention. For example, the present invention could be employed to convert curvilinear reciprocating motion to rotary motion and vice versa, as when a curvilinear guide is employed for governing the travel of the reciprocating element. All such variations and modifications are intended to be included within the scope of the invention as defined in the appended claims.

I claim:

1. A motion converter apparatus, comprising a shuttle having an aperture therein, at least a portion of a peripheral boundary defining said aperture having a trackable profile, said shuttle being moveable along a linear path; a rotatable crankshaft having a crankpin, said crankpin positioned within said aperture with the axis of rotation of said crankshaft substantially perpendicular to said linear path; and a pair of tracking sectors positioned between said crankpin and said trackable profile, said sectors rotatable about said crankpin and independently articulatable through a selected range of degrees, said sectors engaging said trackable profile such that motion is transferable between said crankpin and said shuttle through said sectors.

2. The apparatus of claim 1, wherein said portion having a trackable profile is divided into a pair of opposing portions disposed on opposing sides of said aperture.

3. The apparatus of claim 2, wherein said sectors prevent said crankpin from contacting said peripheral boundary of said aperture throughout the range of motion of said crankshaft.

4. The apparatus of claim 3, wherein each of said sectors is laterally displaced along said crankpin axis such that throughout the range of motion of said crankshaft there exists at least one line perpendicular to said crankpin axis passing through both sectors.

5. The apparatus of claim 4, wherein said opposing portions and said sectors restrict the motion of said crankpin along a predetermined path relative to said shuttle.

6. The apparatus of claim 5, wherein said sectors pivot upon said crankpin as said crankpin traverses said predetermined path.

7. The apparatus of claim 6, wherein sectors are counter-rotating.

8. The apparatus of claim 7, wherein said sectors are pivoted by engagement with said opposing portions, said portions being substantially immovable in a direction perpendicular to said linear path.

9. The apparatus of claim 8, wherein said opposing portions have a trackable profile with a linear pitch line.

10. The apparatus of claim 9, wherein said opposing portions have uniform hypocycloidal/epicycloidal teeth which mate with uniform epicycloidal/hypocycloidal teeth on said sectors.

11. The apparatus of claim 10, wherein said pitch line is inclined from a line normal to said linear path.

12. The apparatus of claim 11, wherein said epicycloidal/hypocycloidal teeth are concentrically disposed on said sectors relative to the axis of rotation of said sectors upon said crankpin.

13. The apparatus of claim 12, wherein said sectors are alike.

14. The apparatus of claim 9, wherein said pitch line of said opposing portions are normal to said linear path.

15. The apparatus of claim 14, wherein said opposing portions have uniform hypocycloidal/epicycloidal teeth which mate with uniform epicycloidal/hypocycloidal teeth on said sectors.

16. The apparatus of claim 15, wherein said epicycloidal/hypocycloidal teeth are eccentrically disposed on said sectors relative to the axis of rotation of said sectors upon said crankpin.

17. The apparatus of claim 16, wherein said sectors are alike and said opposing portions are alike.

18. The apparatus of claim 8, wherein said opposing portions have a curved pitch line.

19. The apparatus of claim 18, wherein said curved pitch line is a simple curve.

20. The apparatus of claim 18, wherein said curved pitch line is a compound curve.

21. The apparatus of claim 8, wherein said opposing portions include repetitive, uniform surface undulations relative to a base plane.

22. The apparatus of claim 8, wherein said opposing portions include non-repetitive, non-uniform surface undulations relative to a base plane.

23. The apparatus of claim 8, wherein said opposing portions are alike.

24. The apparatus of claim 8, wherein said opposing portions are dissimilar.

25. The apparatus of claim 8, wherein said opposing portions include first surface undulations and second surface undulations disposed at an angle relative to said first undulations.

26. The apparatus of claim 8, wherein said opposing portions have a varying width.

27. The apparatus of claim 8, wherein said opposing portions include hypocycloidal/epicycloidal undulations.

28. The apparatus of claim 8, wherein said opposing portions include epicycloidal/hypocycloidal undulations.

29. The apparatus of claim 8, wherein said opposing portions include a plurality of dimples.

30. The apparatus of claim 8, wherein said sectors are rotatably secured to said crankpin by U-shaped bearing caps.

31. The apparatus of claim 8, wherein said sectors are rotatably secured to said crankpin by tabs extending from said sectors over which retaining rings are slipped.

32. The apparatus of claim 8, wherein said shuttle reciprocates at least one piston within a mating cylinder along said linear path.

33. The apparatus of claim 8, wherein said cylinder is that of an internal combustion engine.

34. The apparatus of claim 8, wherein said shuttle is guided along said linear path by said piston and said cylinder.

35. The apparatus of claim 8, wherein said aperture extends through said shuttle.

36. The apparatus of claim 8, wherein said aperture is blind, whereby it does not extend through said shuttle.

37. The apparatus of claim 8, wherein each of said sectors has a surface which contacts said opposing portions.

38. The apparatus of claim 37, wherein said contact surfaces of said sectors have repetitive, uniform surface undulations relative to a base cylinder.

39. The apparatus of claim 37, wherein said contact surfaces of said sectors have non-repetitive, non-uniform surface undulations relative to a base cylinder.

40. The apparatus of claim 37, wherein the pitch line of said contact surfaces are concentric to the axis of rotation of said sectors.

41. The apparatus of claim 37, wherein the pitch line of said contact surfaces is eccentric to the axis of rotation of said sectors.

42. The apparatus of claim 37, wherein said contact surfaces have epicycloidal/hypocycloidal undulations.

43. The apparatus of claim 37, wherein said contact surfaces have hypocycloidal/epicycloidal undulations.

44. The apparatus of claim 37, wherein said contact surfaces taper.

45. The apparatus of claim 37, wherein said contact surfaces include protuberant nodules.

46. The apparatus of claim 37, wherein said sectors have a bearing surface in contact with said crankpin.

47. The apparatus of claim 3, wherein said crankshaft is rotatable through 360 degrees.

48. The apparatus of claim 3, wherein the arcs subtended by each of said sectors is equal.

49. The apparatus of claim 3, wherein the arcs subtended by each of said sectors is unequal.

50. The apparatus of claim 3, wherein said sectors have a trackable contact pitch line greater than 1 degree and less than 120 degrees in arc length.

* * * * *

REEXAMINATION CERTIFICATE (2601st)
United States Patent [19]
Brackett

[11] B1 5,259,256
[45] Certificate Issued Jun. 13, 1995

[54] MOTION CONVERTER WITH PINION SECTOR/RACK INTERFACE

[76] Inventor: Douglas C. Brackett, P.O. Box 306, Portland, Me. 04112

Reexamination Request:
No. 90/003,657, Dec. 9, 1994

Reexamination Certificate for:
Patent No.: 5,259,256
Issued: Nov. 9, 1993
Appl. No.: 924,547
Filed: Jul. 31, 1992

[51] Int. Cl.⁶ ............................................. F16H 21/18
[52] U.S. Cl. ........................................ 74/49; 74/50; 92/136; 92/138; 123/55.5; 123/55.7
[58] Field of Search ............... 74/46, 49, 50; 92/136, 92/138; 123/55.5, 55.7, 197.3, 197.4

[56] References Cited
U.S. PATENT DOCUMENTS

| | | | |
|---|---|---|---|
| 5,741 | 8/1848 | McLaughlin | 74/32 |
| 19,726 | 3/1858 | Van Doren | 74/32 |
| 116,617 | 7/1871 | McCamy | 74/32 |
| 139,499 | 6/1873 | Doolittle | 74/49 X |
| 185,521 | 12/1876 | Gregersen | 74/32 |
| 347,644 | 8/1886 | Salmon | 74/49 X |
| 410,432 | 9/1889 | McKaig | 92/136 |
| 508,387 | 11/1893 | Humphries | 74/32 |
| 637,450 | 11/1899 | Doolittle | 74/49 X |
| 671,583 | 4/1901 | Carmack | 74/32 |
| 735,743 | 8/1903 | Fowler | 74/461 X |
| 762,646 | 6/1904 | Morison | 74/49 |
| 795,244 | 7/1905 | Armstead | 74/32 |
| 3,035,793 | 5/1962 | Ralph et al. | 74/422 X |
| 3,945,358 | 3/1976 | Collins | 123/50 A |
| 4,331,108 | 5/1982 | Collins | 123/50 R |
| 4,485,769 | 12/1984 | Carson | 123/61 R |
| 4,543,919 | 10/1985 | Carson | 123/53.4 |
| 4,658,768 | 4/1987 | Carson | 123/53.2 |
| 4,932,373 | 6/1990 | Carson | 123/55.7 X |

OTHER PUBLICATIONS

SAE Technical Paper No. 901532, Aitken et al., Aug. 13, 1990, The CMC Scotch Yoke Engine–A Family of Engines for Automotive Use.
SAE Technical Paper No. 920675, Close et al., Feb. 24, 1992, The New Collins Compact Scotch Yoke Engine.
Scott, New Wave Two Stroke, Popular Science, Jan. 1990.

*Primary Examiner*—Allan D. Herrmann

[57] ABSTRACT

A device for translating rotary to linear motion and vice versa includes a reciprocating linearly moving shuttle with a central aperture. The aperture has a pair of opposing gear racks protruding towards the center and which capture therebetween a pair of pinion sectors rotatably mounted to the crankpin of a rotatable crankshaft with the axis of crankshaft rotation perpendicular to the linear path of the shuttle. The pinion sectors are free to rotate about the crankpin and articulate independently of each other through a selected angular range. When the crankpin, including the pinion sectors, is inserted into the shuttle aperture with the pinion sectors engaging the racks, motion is transferable between the crankpin and the shuttle through the pinion sectors.

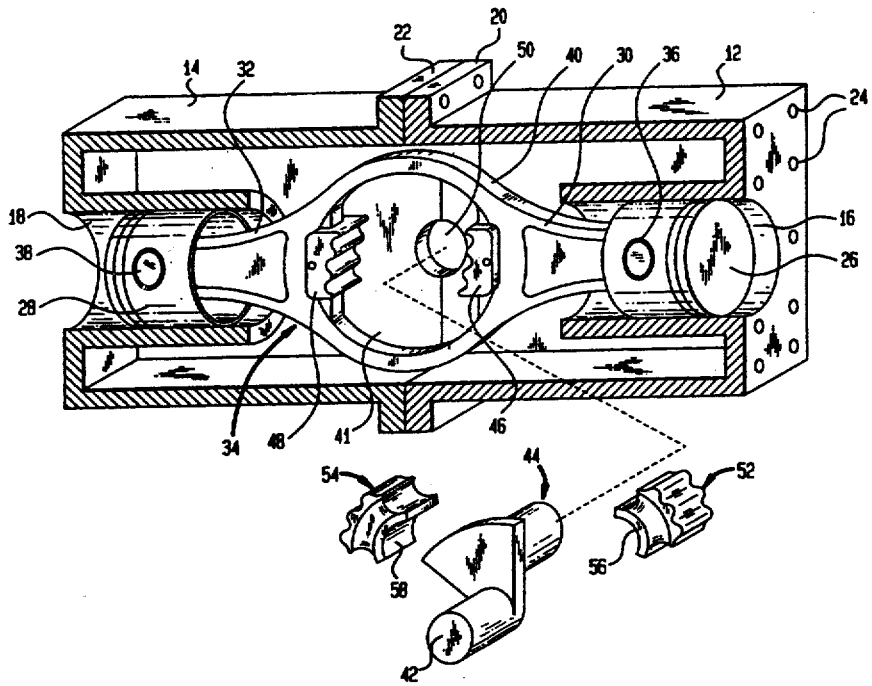

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

Claim 2 is determined to be patentable as amended.

Claims 3-50 dependent on an amended claim, are determined to be patentable.

New claims 51-58 are added and determined to be patentable.

2. The apparatus of claim 1, *51, 52, 53, 54, 55, 56, 57 or 58,* wherein said portion having a trackable profile is divided into a pair of opposing portions disposed on opposing sides of said aperture.

*51. The apparatus of claim 1, wherein the circumferential length of said trackable profile is equal to the circumferential length of said sectors engaging said trackable profile and said sectors track along said trackable profile without loss of contact in contiguous conjugation throughout the range of motion of the apparatus.*

*52. The apparatus of claim 1, wherein there is no tip-to-root clearance between said sectors and said trackable profile.*

*53. The apparatus of claim 1, wherein each portion of said trackable profile engages a corresponding contact portion on said sectors.*

*54. The apparatus of claim 1, wherein said sectors track along said trackable profile without slippage.*

*55. The apparatus of claim 1, wherein said sectors track along said trackable profile without scuffing.*

*56. The apparatus of claim 1, wherein each of said tracking sectors includes means for engaging said trackable profile such that said sectors track along said trackable profile with each portion of said trackable profile engaging a corresponding contact portion on said sectors.*

*57. The apparatus of claim 1, wherein each of said tracking sectors includes means for engaging said trackable profile such that said sectors track along said trackable profile without slippage.*

*58. The apparatus of claim 1, wherein each of said tracking sectors includes means for engaging said trackable profile such that said sectors track along said trackable profile without scuffing.*

* * * * *